Oct. 21, 1969   R. W. BYBEE ET AL   3,474,228
SYNCHRONOUS FIRING ELECTRIC HEATING SYSTEM
Filed Dec. 28, 1966   2 Sheets-Sheet 1
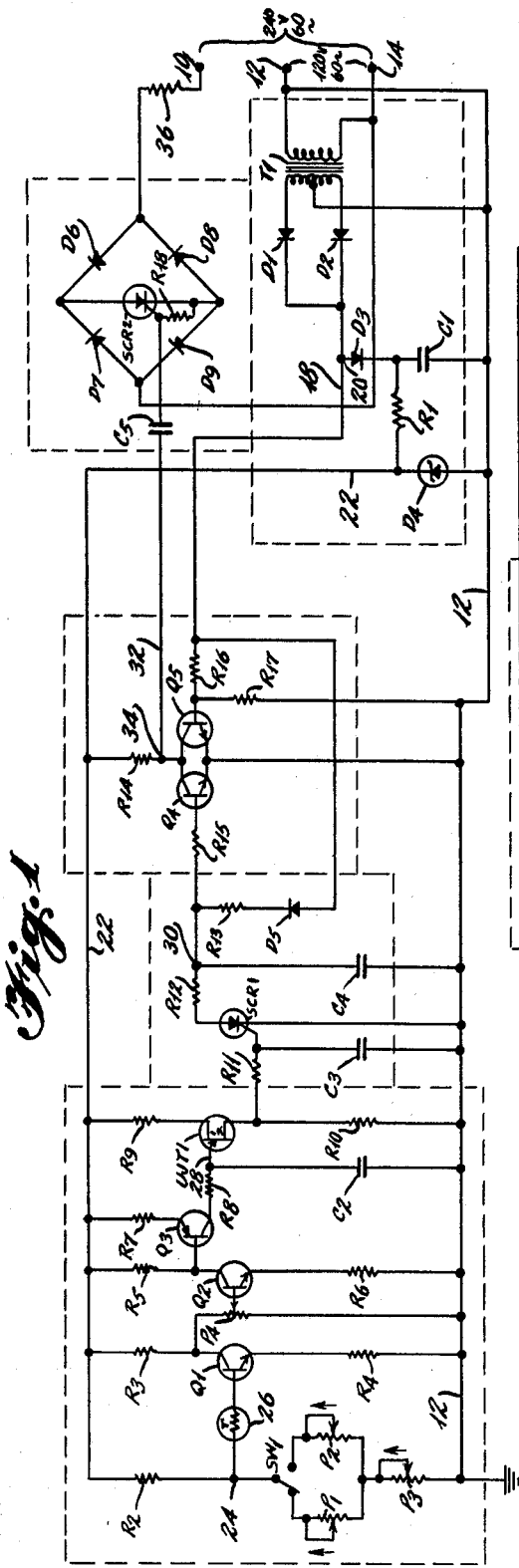
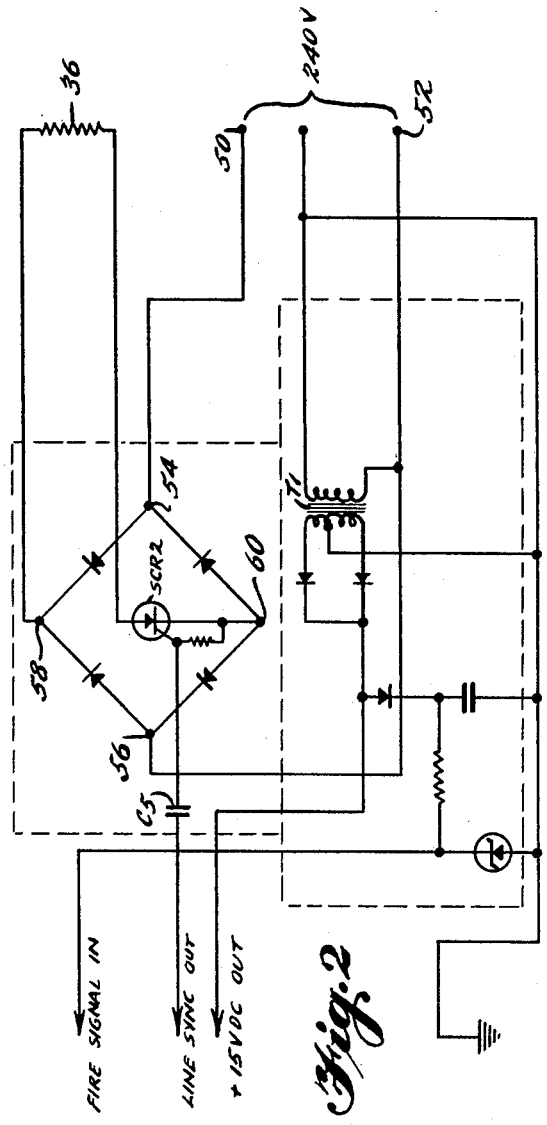
INVENTORS
ROGER W. BYBEE and
LAWSON M. PHYFE
BY
ATTORNEYS

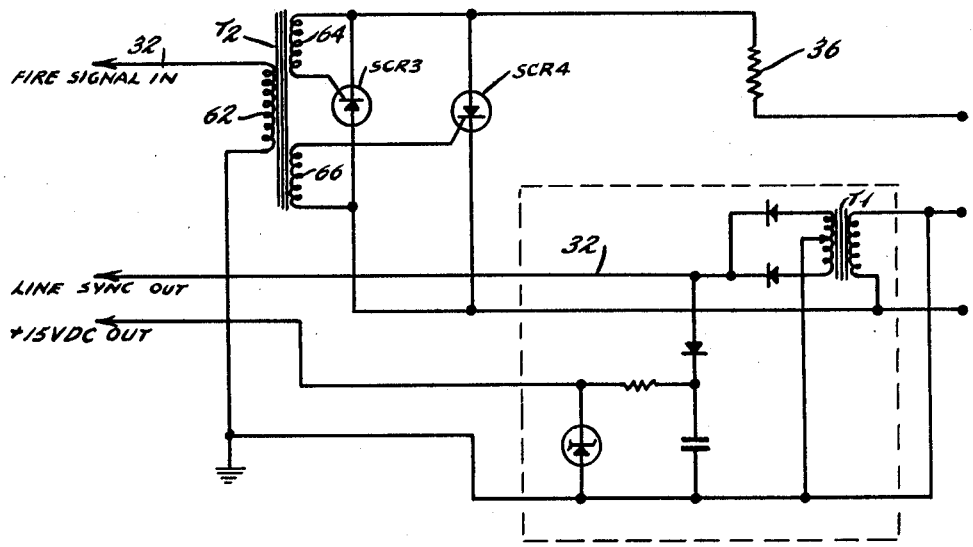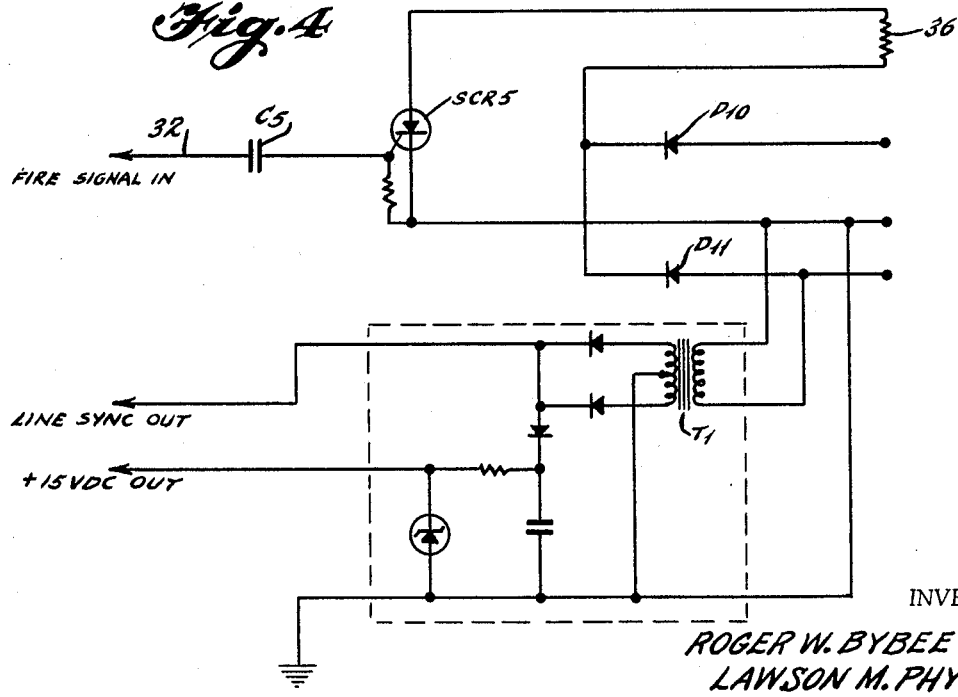

United States Patent Office 3,474,228
Patented Oct. 21, 1969

3,474,228
SYNCHRONOUS FIRING ELECTRIC HEATING
SYSTEM
Roger W. Bybee, Santa Fe, and Lawson M. Phyfe,
Albuquerque, N. Mex., assignors, by mesne assignments, to Aztec Industries, Inc., Santa Fe, N. Mex.,
a corporation of Nevada
Filed Dec. 28, 1966, Ser. No. 605,483
Int. Cl. H05b 1/02
U.S. Cl. 219—501          15 Claims

ABSTRACT OF THE DISCLOSURE

A system for controlling the application of an A.C. current to a load is provided wherein a sensing element at low voltage controls the frequency of an oscillator which in turn through a pulse memory gate controls one element of a NAND gate, also under control of the phase of the A.C. current applied to the load. A second NAND gate is under control of the phase of the A.C. current so that when the sensing device calls for application of current to the load, and the A.C. wave is passing through its zero, current is applied to the load, without shock. The load may be a heater in series with a bridge circuit containing a gate for the heater or may be incorporated within the bridge circuit and the sensing element may be a temperature sensitive device with plural controls therefor.

BACKGROUND OF THE INVENTION

The invention relates to control circuits for the application of current to a load and specifically to the control of the application of an A.C. current to a space heater under control of a heat sensitive element. The heat sensitive element itself is under control of various instrumentalities so that it may be preliminarily adjusted for proper operation and subsequently adjusted at will for desired day operation and other desired night operation.

The system herein described is an improvement over the prior art as exemplified by: 2,994,759, Lipman; 3,149,224, Horne et al.; 3,161,759, Gambill et al.; 3,275,-802, Vandivere et al.

SUMMARY OF THE INVENTION

It is an object of the invention to provide a system wherein an A.C. current is supplied to a load and wherein the current is applied to the load only substantially when the zero voltage phase of the A.C. wave is existent.

Another object of the invention is to provide a heating system wherein a single heat sensitive element is under control of a multiplicity of control devices therefor so that the element may react differently for different parts of a day.

How these and other objects have been obtained can be learned after consideration of the following specification and accompanying drawings.

BRIEF DESCRIPTION OF THE DRAWINGS

FIG. 1 is a schematic drawing of a synchronous firing electric heating system;
FIG. 2 is a wiring diagram of a modified form of power supply for the heater;
FIG. 3 is a wiring diagram of a still further form of power supply for he heat; and
FIG. 4 is a wiring diagram of yet another form of power supply for the heater.

DESCRIPTION OF THE PREFERRED EMBODIMENTS

Now considering the drawings in greater detail, at 10, 12 and 14 in FIG. 1 are disclosed terminals to which may be attached the lines of a three-wire A.C. supply as a 60 cycle per second supply, with 240 volts across the terminals 10 and 14, and 120 volts across the terminals 12 and 14. The line attached to the terminal 12 may be the neutral wire of such a three-wire system and be considered as grounded.

A low voltage supply, as 15 volts D.C., suitable for use with the various electronic units to be fed by the supply may, in the form of invention shown in FIG. 1, be supplied by the step-down transformer $T_1$ and the two diodes $D_1$ and $D_2$ providing unfiltered full wave rectification fed to a line 18 and a branch line 20. In the branch line there is provided a diode $D_3$ feeding current to a line 22, the current in line 22 being filtered by capacitor $C_1$ and resistor $R_1$ and with the voltage regulated by Zener diode $D_4$. The purpose of diode $D_3$ is to prevent filtered D.C. current from being fed back into line 18, since it is desired to maintain in that line the pulsing characteristics of the 120 cycle current created therein by the transformer $T_1$ and the diodes $D_1$ and $D_2$.

The low voltage rectified and filtered current in line 22 is fed to a voltage divider consisting of resistor $R_2$ in one leg of a string of resistors and in the other leg of the string, in series, a switch $Sw_1$, paralleled potentiometers $P_1$ and $P_2$ and series potentiometer $P_3$. Switch $Sw_1$ can be thrown one way or another depending on whether day or night temperatures are to be sensed, as will be explained and the switch may be operated by a clock, if desired. Potentiometer $P_1$ may be manually adjusted for day level setting of the temperature at which it is desired the heater shall be turned on and potentiometer $P_2$ may be manually adjusted for night time level setting of the instrument. Thus the parts accessible to a person adjusting the cotnrols are at low potential, avoiding chance of shock hazard. Potentiometer $P_3$ is utilized to initially set up the control system and is intended to be normally inaccessible to the operator. Depending on the voltage at the junction 24 between the legs of the voltage divider string more or less current will pass through a heat sensitive instrument 26, which may be a positive thermistor and fed to the base of an NPN transistor $Q_1$, thereby varying the flow of current from the 15 volt supply line 22, through resistor $R_3$, transistor $Q_1$ and stabilizing negative feedback prevention resistor $R_4$ to ground line 12. A potentiometer $P_4$ shunting the transistor and resistor $R_4$ is provided so that a desired part of the potential at the collector of transistor $Q_1$ may be applied to the base of transistor $Q_2$. The potentiometer $P_4$ like potentiometer $P_3$ is provided for initial adjustment of the instrument to effect proper response of the heater. With respect to transistor $Q_2$, current flows through the collector and emitter of the transistor via resistors $R_5$ and $R_6$, the potential at the collector of transistor $Q_2$ being applied to the base of PNP transistor $Q_3$. A current limiting resistor $R_7$ is connected between the 15 volt positive line 22 and the emitter of the transestor $Q_3$, while the collector is connected to the emitter of unijunction transistor UJTI by a line 28 to which is connected RC timing elements consisting of resistor $R_8$ and capacitor $C_2$, which elements in conjunction with resistor $R_7$ and transistor $Q_3$ time the oscillation of transistor UJTI. Recapitulating, if the ambient temperature decreases, the resistance of thermistor 26 increases, increasing the voltage on the collector of transistor $Q_1$. This increase in voltage tends to lower the voltage on the collector of transistor $Q_2$. As the collector voltage on transistor $Q_2$ decreases, more current is conducted through transistor $Q_3$ to the emitter of unijunction transistor UJTI and to the timing capacitor $C_2$. As is well known a unijunction transistor inherently has oscillatory characteristics and will act as a relaxation oscillator due to the increasing forward biasing of the emitter and causing the dropping of the resistance between base and emitter to a low value. The frequency of oscillation will depend upon the rate of build-up of charge on the capacitor $C_2$. Base #1 of the transistor UJT1 is connected to line 22 via a limiting resistor $R_9$, while base #2 is connected to ground via a resistor $R_{10}$, creating a potential at base #2 of the transistor UJT1.

The potential at this base #2 is fed via a resistor $R_{11}$ shunted by a storage capacitor $C_3$ to the gate of silicon controlled rectifier SCR1 forming part of a pulse memory unit which may be said to also include a resistor $R_{12}$ in series with the anode of the rectifier, a storage capacitor $C_4$ shunting resistor $R_{12}$ and the rectifier and a series connected diode $D_5$ and resistor $R_{13}$ connected in between the line 18 fed with unfiltered 120 cycle per second current and the junction 30 of the capacitor $C_4$ with resistor $R_{12}$.

The pulse memory device operates as follows: The positive pulses at base #2 of the oscillator transistor are fed via filter resistor $R_{11}$, shunted by capacitor $C_3$, to the gate of rectifier SCR1. When an oscillator pulse turns rectifier SCR1 on, capacitor $C_4$ discharges rapidly and the voltage at junction 30 drops almost to zero since the cathode of the rectifier SCR1 is at ground potential, and it will remain close to zero until the next zero of the line sync signal from diode $D_5$ and resistor $R_{13}$ at which time no further current is fed into the RC system involving $C_4$, $R_{12}$ and SCR1, insufficient current will flow through rectifier SCR1 to maintain it conductive and the rectifier will turn off. Now the potential will rise in the system and the potential at junction 30 will rise. This potential will be utilized at that time to operate part of a NAND circuit.

The NAND circuit comprises a pair of NPN transistors $Q_4$ and $Q_5$ whose emitters are tied together and whose collectors are also tied together. The emitters are grounded while the collectors are fed with 15 volts D.C. positive, via current limiting and voltage dropping resistor $R_{14}$. The base of transistor $Q_4$ is fed via resistor $R_{15}$ from the potential at junction 30 while the base of transistor $Q_5$ is fed via line 18 and resistor $R_{16}$ with the unfiltered 120 cycle D.C. current. A shunting resistor $R_{17}$ is utilized to form with the resistor $R_{16}$ a voltage divider to insure proper normal biasing voltage on the base of transistor $Q_5$.

The NAND gate is utilized to trigger a second silicon controlled rectifier SCR2 only when the voltages applied to the bases of transistors $Q_4$ and $Q_5$ are substantially zero. For this purpose a line 32 incorporating a blocking capacitor $C_5$ joins the gate of rectifier SCR2 at a junction point 34 between resistor $R_{14}$ and the collectors of transistors $Q_4$ and $Q_5$. Capacitor $C_5$ not only blocks D.C. current from line 22 reaching the gate, but also reduces the hazard of A.C. line voltage being transmitted to the level adjusting potentiometers and other parts.

Recapitulating, low potential exists at the base of transistor $Q_4$ only when heat is called for by thermistor 26 and the oscillator UJT1 is rendering rectifier SCR1 conductive simultaneously with low rate of feed of charge to capacitor $C_4$ from line 18 via diode $D_5$ and resistor $R_{13}$ due to the 60 cycle supply current wave passing through zero, while low potential exists at the base of transistor $Q_5$ when the 60 cycle supply current wave is passing through zero by reason of the connection to the base via line 18 and resistor $R_{16}$. When both transistors $Q_4$ and $Q_5$ are substantially non-conductive, the potential at junction 34 rises and a pulse is transmitted to the gate of silicon controlled rectifier SCR2.

Rectifier SCR2 is in a full wave bridge circuit in series with the heater 36 and across the 240 volt lines of the A.C. supply. The bridge circuit comprises the diodes $D_6$, $D_7$, $D_8$ and $D_9$. A resistor $R_{18}$ provides for the creation of a voltage at the gate of rectifier SCR2 when the pulse is applied thereto. Thus when the triggering of rectifier SCR2 is effected the applied wave is passing through zero, and there is no load at that instant applied to the heater and therefore no shock to the heater and bridge circuit. Also radiation noises are reduced and the circuitry is safer from component failure.

It should be noted that while only one heater is illustrated and has been described, it is obvious that a plural number of heaters may be employed, connected in series or in parallel, depending on the capacity of the rectifiers in the bridge circuit.

In the circuit arrangement of FIG. 1, the heater is subjected to an A.C. voltage although the rectifier SCR2 always passes current therethrough in both directions of the A.C. wave.

Should it be desired to pass only rectified current through the heater, the circuit arrangement of FIG. 2 may be utilized.

In the circuit of FIG. 2 the 240 volt line terminals 50, 52 are connected to opposite legs of the bridge, as at 54, 56; the heater 36 is connected in series with the anode of the rectifier SCR2, and juncture 58 of the bridge, the cathode of the rectifier, as before, being connected with the juncture 60 of the bridge. The capacitor $C_5$ is still utilized to isolate the high voltage side of the apparatus from the parts of the apparatus which are ordinarily adjusted by an operator.

Another mode for pulsing a load, such as the heater, and under control of a pulsing device is illustrated in FIG. 3.

In FIG. 3 the circuit is a double SCR type and there is no full wave bridge as in the previous forms of the invention. In this form of pulser, the pulse in line 32 is fed to the primary 62 of a transformer $T_2$, the transformer being provided with two secondaries 64 and 66 oppositely phased so that the secondaries will apply pulses to oppositely poled silicon controlled rectifiers SCR3 and SCR4 so that only one will fire at any one time. For example, if the line voltage at a given instant has a polarity such that the upper line is positive and the lower line negative, rectifier SCR3 would conduct upon a receipt of a firing pulse. If the upper line were negative and the lower positive, as would be the case a half cycle later, rectifier SCR4 would conduct upon receipt of a firing pulse. The load of course would see an alternating current.

In FIG. 4 there is disclosed still another form of firing control for the load. This circuit is a full wave rectifying D.C. type, but it is not a bridge type. The 240 v. AC is rectified before the heater, so the heater load always sees a direct current when the rectifier SCR5 conducts. Notice, however, that current is drawn from one side of the 240 v. AC line or the other and conducted to the A.C. neutral or ground leg rather than from one side of the 240 volt line to the other side as in the previous forms. As compared to the form shown in FIG. 1, there are two fewer power diodes, but this is achieved at the expense of providing only 120 volts to the load rather than 240 volts as in the other forms. If the upper line is assumed to be positive at a given instant, the current path would be through a diode $D_{10}$, the heater 36, the rectifier SCR5, and back to neutral. If the lower 240 volt line is assumed to be negative, then the current path would be through diode $D_{11}$, the heater 36, the rectifier SCR5, and back to neutral. The low voltage power supply is the same as in the other forms.

In all forms of the invention, any time an oscillator pulse is generated, the pulse memory circuit stores this information and feeds the stored signal to the NAND gate. At the next succeeding zero level of the alternating current, the line sync network sends a pulse to the other input of the NAND gate, causing the NAND gate to send a pulse to the gate of a rectifier, as rectifier SCR2, turning it on. At this time the pulse memory is cleared, and it awaits another oscillator pulse. The oscillator frequency is still independent of the A.C., but the firing of the rectifier is not. Power pulses would still be generated at intervals dependent upon the oscillator frequency, which is in turn dependent on the temperature, but each power pulse would always be at least one half cycle or 8.3 milliseconds in duration. In very high power demand situations the oscillator frequency would approach 120 cycles per second, and conduction would occur during almost every half cycle. At maximum power demand the oscillator frequency would exceed 120 cycles per second, and conduction would occur continuously. The oscillator and amplifier are designed to span a range of frequencies from more than 120 cycles per second down to one pulse every several seconds.

It will be obvious to one skilled in the art that various changes may be made in the system without departing from the spirit and scope of the invention, and, therefore, the invention is not limited by that which is illustrated and described in the specification, but only as indicated in the accompanying claims.

What is claimed is:

1. A system comprising a load adapted to be coupled to an alternating current source, a first gate controlling the coupling of said source to said load, a means sensitive to a condition, an oscillator the frequency of which is controlled by said means, a memory storage device fed by pulsating current from said alternating current source, and a second gate controlled by pulses from said oscillator, a third gate, said third gate being a NAND gate, one of whose elements is under control of said memory storage device and another of whose elements is under control of rectified pulses from the alternating current source, means providing current flow through said third gate and having a connection to the first gate so that the first gate will be opened when the third gate is closed.

2. A system as defined in claim 1 in which the memory storage device includes a capacitor and resistor in series with each other bridging a gated silicon controlled rectifier, the combination being fed from a conductor with rectified positive pulses at the juncture of the capacitor and resistor, and the gate of the rectifier being connected to the oscillator.

3. The system as defined in claim 2 wherein the rectified pulses in the conductor originate at the secondary of a transformer whose output is provided with diodes to obtain an unfiltered pulsating direct current.

4. The system as defined in claim 3 wherein the conductor is further provided with a series connected diode and resistor, the series connected diode being forward biased to conduct positive going pulses to the memory storage device.

5. The system of claim 1 wherein the NAND gate comprises a pair of NPN transistors whose emitters are connected to each other and to ground potential and whose collectors are connected to each other and to a source of direct current positive potential via a resistor, pulses at the juncture between the resistor and collectors being conducted to said first gate, the base of one transistor being connected to the output from the memory storage device and the base of the second transistor being supplied with rectified positive pulses derived from the alternating current source.

6. The system of claim 1 wherein the load comprises a heater and the means sensitive to a condition is a heat sensitive device.

7. The system of claim 6 wherein adjustment means are provided to alter the response of the heat sensitive device.

8. The system of claim 7 wherein the adjustment means is fed from a low voltage supply shock isolated from the alternating current source.

9. The system of claim 6 wherein a second adjustment means is provided and switch means to select either one of the adjustment means to provide for day and night control of the heater.

10. A system as defined in claim 1 wherein the first gate is a silicon controlled rectifier in a bridge circuit, the bridge circuit being in series with the load.

11. A system as defined in claim 1 wherein the first gate is a silicon controlled rectifier in a bridge circuit, the silicon controlled rectifier and load being in series and bridging opposite points in the bridge circuit.

12. A system as defined in claim 1 wherein the gate comprises a pair of paralleled silicon controlled rectifiers poled in opposite directions and in series with the load across the alternating current source, the gates of the rectifiers being connected respectively to individual secondary windings of a transformer, the primary of which is pulsed from said NAND gate.

13. A system as defined in claim 1 in which the alternating current source is a three-wire 240 volt system with a neutral wire so that 120 volts exists between the neutral wire and each of the other wires, said system including a pair of 240 volt conductors with a diode in each conductor and poled in the same direction and feeding a common conductor, the common conductor, the load, and the first gate being in series with the neutral wire.

14. A system comprising a load adapted to be coupled to an alternating current source, means sensing a condition, a memory circuit responsive to said condition sensing means for storing and providing an output in accordance with the condition sensed, a gating device controlled by both said memory circuit output and the phase of the alternating current voltage supply for providing a gating condition, and means responsive to said gating device gating condition for initiating coupling of the alternating current source to the load only when the voltage of the alternating current source is substantially zero and said condition sensing means senses a condition requiring said coupling.

15. A system as defined in claim 14 wherein said gating device comprises a NAND gate including two transistors, one of said two transistors being connected for response to said condition sensing means and the other of said two transistors being connected for response to the phase of the A.C. source such that both are non-conductive when the sensed condition requires that the load be coupled to said source and the phase of said source is substantially at zero voltage for providing said coupling initiating gating condition.

References Cited

UNITED STATES PATENTS

| | | | |
|---|---|---|---|
| 3,149,224 | 9/1964 | Horne et al. | 219—501 |
| 3,161,759 | 12/1964 | Gambill et al. | 219—501 |
| 3,275,802 | 9/1966 | Vandivere et al. | 219—501 |
| 2,994,759 | 8/1961 | Lipman | 219—501 |
| 3,381,226 | 4/1968 | Jones et al. | 219—501 |

BERNARD A. GILHEANY, Primary Examiner

F. E. BELL, Assistant Examiner